Patented Aug. 14, 1945

2,382,155

UNITED STATES PATENT OFFICE 2,382,155

ARTIFICIAL STRUCTURAL MATERIAL AND PROCESS OF MAKING IT

Paul W. Jones and John W. Swezey, La Fayette, Ind., assignors to Rostone Corporation, La Fayette, Ind., a corporation of Indiana No Drawing. Application September 11, 1941, Serial No. 410,431

4 Claims. (Cl. 106—118)

It is the object of our invention to produce a low-cost artificial structural material or synthetic stone of increased strength, both against compression and against flexure.

Our present application is a continuation in part of our co-pending application Serial No. 149,274, filed June 19, 1937.

Our new artificial structural material or synthetic stone is made mainly of anhydrous alumino-silicate material, such as fly-ash or slag or pumice, with an alkaline-earth base and water, indurated under moist heat. To that extent, our present invention follows the teaching of U. S. Patent No. 1,942,769, granted to Peffer and one of us (Jones) on January 9, 1934; on which patent it is an improvement.

We have discovered that if in addition to the anhydrous alumino-silicate material we use in the mixture with the alkaline-earth base and the water a relatively smaller amount of alumino-silicic acid material, we not only get an increase in both compression and flexure strengths, but that that increase is surprisingly great—surprisingly much greater in proportion than the proportion of added alumino-silicic acid material. While synthetic stone made of alumino-silicic acid material, an alkaline-earth base, and water are well-known—as set forth in U. S. Patent No. 1,852,672, granted to Peffer, Harrison, and Ross on April 5, 1932—nothing in connection with such previously known synthetic stone would lead one to expect that a small addition of alumino-silicic acid material in the mixture of anhydrous alumino-silicate material, alkaline-earth material, and water would produce an increase in strength so greatly in excess proportionately of the addition so made.

By "anhydrous alumino-silicate material" we mean materials which contain, at least in part, alumina and silica in combination, but which are generally considered as essentially having no water in their molecular constitution. Among this group of materials are various slags, clinker, and scoriae; and also "fly-ash," which is the finely powdered ash from the combustion of powdered coal; and also various naturally occurring alumino-silicate minerals, like lava and pumice and volcanic ash. These materials, and especially the fly-ash, are relatively inexpensive, so that their use involves low cost.

By "alumino-silicic acid material" we mean those naturally occurring materials, such as shales, slates, clays, gneiss, and schists, which contain, at least in part, one or more of the alumino-silicic acids, and also contain in part water of constitution.

In carrying out our present invention we mix anhydrous alumino-silicate material and a smaller amount of alumino-silicic acid material with an alkaline-earth base and water, with the solid materials all in finely comminuted form; and subject the moist mass to moist heat to produce chemical reaction and induration.

The proportion of the alumino-silicic acid material to the anhydrous alumino-silicate material may vary considerably. Any amount of it is surprisingly helpful, from as little as 1% or 2% usually up to about 70% by weight of the amount of anhydrous alumino-silicate material. But the optimum amount, for getting increased strength at relatively little increased cost, is much less than that 70%, and varies somewhat with the particular alumino-silicic acid material used; and for low-cost structural material of high strength we prefer to add between 1.5% and 25% of the alumino-silicic acid material, as it is in that range that we usually get proportionately the greatest increase in strength per unit weight of the more costly added alumino-silicic acid material.

The alkaline-earth base is most commonly lime, either high-calcium or dolomitic; and while desirably of approximately sufficient amount and no more for substantially complete reaction with the alumino-silicic acid material and the anhydrous alumino-silicate material, it may in practice vary considerably in amount, from about 5% to about 45% (in terms of hydrated lime) of the combined weight of the alumino-silicic acid and anhydrous alumino-silicate materials, usually with best results if it is between 8% and 25% of that combined weight. The approximate amount of lime for maximum strength may be computed by adding 50% of the weight of the alumino-silicic acid material and 10% of the weight of the anhydrous alumino-silicate material.

The water should be sufficient in amount to produce thorough wetting. This is somewhat in excess of the amount required for reaction, and is usually equal to between 15% and 25% of the total weight of the solid ingredients. The water is desirably added only after the solid ingredients have been thoroughly comminuted and mixed in dry form.

The precise optimum proportions of these ingredients vary somewhat with different alumino-silicic acid materials, and for each such material a determination by test may be necessary if maximum strength at minimum cost is desired. But although the optimum proportions may require tests, our invention is not limited to optimum proportions; for a marked and surprising beneficial effect on both compressive and flexural strengths, and on toughness, is obtained at disproportionately low increase in cost when any amount of alumino-silicic acid material up even to 70% of the amount of anhydrous alumino-silicate material used is added to a mixture of anhydrous alumino-silicate material, an alkaline-earth base, and water in making artificial structural material.

In performing our process, the anhydrous alumino-silicate material (if not already sufficiently fine), the alumino-silicic acid material, and the alkaline-earth base, are ground to desired fineness, preferably at least as fine as minus 200 mesh to minus 325 mesh per inch; and are thoroughly intermixed, desirably with all ingredients dry. Then the dry mixture is thoroughly mixed with the predetermined proportion of water, as in a muller or a wet pan, until the whole becomes a compact wetted mass in which there is intimate particle contact of colloidal or quasi-colloidal character. Then this wet mass is shaped as desired, as in molds, under pressure and/or tamping if desired. Then the shapes (or shaped masses) are subjected to moist heat, conveniently steam under pressure, but without complete drying, until the desired chemical reaction among the ingredients is effected. Final complete drying may then be done, in the air or in an oven; but ordinarily this is neither desired nor necessary.

*Example 1*

In one practical example of our process, 100 parts (by weight) of fly ash (here one obtained from the Detroit Edison Company), 2 to 20 parts by weight of shale (here an Indiana knobstone shale) containing alumino-silicic acid, and 10 to 20 parts of hydrated (slaked) lime, all of sufficient fineness to pass through a 200 mesh or even through a 325-mesh screen, are thoroughly mixed while dry. Then 15 to 25 parts of water are added; and the whole is mixed, in a wet pan or similar machine, to produce a thoroughly wetted quasi-colloidal mass. This wet mass is now formed into the desired shapes, usually in molds; as by hydraulic pressing under pressure from 1500 to 6000 pounds per square inch, or by heavy tamping either on the mass itself or on a cover plate laid over it. The shaped mass is now put in an autoclave or indurating chamber; and, if desired after first being exposed to normal room conditions for several hours (as over night) although that need not be done, is subjected for about two hours to saturated steam at a pressure of about 50 to 125 pounds per square inch, conveniently about 75 pounds. This steam may either be introduced into the indurating chamber from outside, or be generated in the indurating chamber itself by heating the latter. During this two-hour induration the desired chemical reaction takes place, and the product reaches practically its full strength and is ready for use; although drying after the induration produces some further increase in strength.

The product thus obtained is definitely stronger than one similarly made with the shale omitted. This is clear from the following tables A to H, in which the amounts of fly ash, clay or shale, and lime are given in parts by weight, and the compressive and flexural strengths are given in pounds per square inch:

*Table A*

| Fly-ash, Detroit Edison Co. | Shale, Knobstone Fountaine Co., Ind. | Lime, high-calcium | Compressive strength |
|---|---|---|---|
| 100 | 0 | 20 | 3,965 |
| 100 | 2.4 | 20 | 5,415 |
| 100 | 9.6 | 20 | 5,890 |
| 100 | 16.8 | 20 | 6,775 |
| 100 | 24.0 | 20 | 7,460 |

*Table B*

| Fly-ash, Detroit Edison Co. | Shale, Knobstone Fountaine Co., Ind. | Lime, high-calcium | Flexural strength |
|---|---|---|---|
| 100 | 0 | 20 | 2,435 |
| 100 | 2.4 | 20 | 2,810 |
| 100 | 9.6 | 20 | 2,955 |
| 100 | 16.8 | 20 | 3,010 |
| 100 | 24.0 | 20 | 3,890 |

*Table C*

| Fly-ash, Detroit Edison Co. | Clay, from near Rosebud, Mo. | Lime, high-calcium | Compressive strength |
|---|---|---|---|
| 100 | 0 | 20 | 3,965 |
| 100 | 2.4 | 20 | 5,170 |
| 100 | 9.6 | 20 | 4,930 |
| 100 | 16.8 | 20 | 5,170 |
| 100 | 24.0 | 20 | 5,775 |

*Table D*

| Fly-ash, Detroit Edison Co. | Clay, from near Rosebud, Mo. | Lime, high-calcium | Flexural strength |
|---|---|---|---|
| 100 | 0 | 20 | 2,435 |
| 100 | 2.4 | 20 | 2,640 |
| 100 | 9.6 | 20 | 3,700 |
| 100 | 16.8 | 20 | 3,470 |
| 100 | 24.0 | 20 | 3,410 |

*Table E*

| Fly-ash, Detroit Edison Co. | Shale, Knobstone Fountaine Co., Ind. | Lime, high-calcium | Compressive strength |
|---|---|---|---|
| 100 | 0 | 20 | 3,615 |
| 100 | 6 | 20 | 4,575 |
| 100 | 12 | 20 | 5,060 |

*Table F*

| Fly-ash, Detroit Edison Co. | Shale, Knobstone Fountaine Co., Ind. | Lime, high-calcium | Flexural strength |
|---|---|---|---|
| 100 | 6 | 20 | 1,880 |
| 100 | 12 | 20 | 2,480 |

*Table G*

| Fly-ash, Detroit Edison Co. | Shale, Knobstone Fountaine Co., Ind. | Lime | Compressive strength |
|---|---|---|---|
| 100 | 0 | 10 | 4,695 |
| 80 | 20 | 18 | 5,443 |
| 60 | 40 | 26 | 7,700 |

*Table H*

| Fly-ash, Detroit Edison Co. | Shale, Knobstone Fountaine Co., Ind. | Lime | Flexural strength |
|---|---|---|---|
| 100 | 0 | 10 | 1,740 |
| 75 | 25 | 20 | 2,070 |
| 50 | 50 | 30 | 2,065 |

In the tests of Tables A to H, the dry materials were thoroughly mixed by hand; an amount of water was used equal to 20% of the total weight of the dry ingredients; and the amounts of lime in Tables G and H were 50% of the weight of shale plus 10% of the weight of fly-ash. The damp mixtures were pressed into the desired shapes at 2500 pounds per square inch in a hydraulic press, to produce a. 2-inch cubes.
b. bars measuring ½ x 2 x 5 inches.

The cubes and bars were indurated by being subjected for two hours to saturated steam at a pressure of 75 pounds per square inch. The 2-inch cubes were used for the compression tests, by crushing in a testing machine. The bars were used for the flexure tests, by mounting them with a 4-inch clear span, and computing the flexural strength by the formula $$\frac{3Pl}{2bd^2}$$

in which

P=the breaking load
l=the span (4″)
b=the width (2″)
d=the thickness (½″)

Other ingredients may be included in addition to the alumino-silicic acid material, the anhydrous alumino-silicate material, the alkaline-earth base, and the water. These other ingredients may be coarse aggregates, such as crushed limestone, granite, marble, or the refuse called "chats" from lead and zinc ore; and/or they may be fibrous or lamellar material, such as asbestos, organic fibers, or mica; and/or they may be talc or gypsum; and/or they may be mineral pigments, if color is desired.

In addition, after induration the artificial structural material or synthetic stone produced may if desired be dried and impregnated, as with some water-repellant substance to prevent absorption of moisture, such for instance as oils or waxes, of either mineral or vegetable origin, or natural or synthetic resins.

But these latter things are incidentals. The fundamental thing is the added smaller amount of alumino-silicic acid material to the anhydrous alumino-silicate material, the alkaline-earth base, and the water.

We claim as our invention:

1. The method of producing artificial structural material or synthetic stone, which consists in mixing anhydrous alumino-silicate material, an amount of alumino-silicic acid material equal to between 1% and 70% by weight of the amount of anhydrous alumino-silicate material, enough alkaline-earth base to produce reaction, and enough water to produce thorough wetting and form a compact wetted mass, with the solid ingredients all finely divided, and subjecting the mixture to induration under moist heat.

2. The method of producing artificial structural material or synthetic stone, which consists in mixing anhydrous alumino-silicate material, an amount of alumino-silicic acid material equal to between 1.5% and 25% by weight of the amount of anhydrous alumino-silicate material, enough alkaline-earth base to produce reaction, and enough water to produce thorough wetting and form a compact wetted mass, with the solid ingredients all finely divided, and subjecting the mixture to induration under moist heat.

3. An artificial structural material or synthetic stone, comprising a compact mixture, indurated under moist heat, of anhydrous alumino-silicate material, an amount of alumino-silicic acid material equal to between 1% and 70% by weight of the amount of anhydrous alumino-silicate material, enough alkaline-earth base to produce reaction, and enough water to produce thorough wetting and form a compact wetted mass, with the solid ingredients all finely divided.

4. An artificial structural material or synthetic stone, comprising a compact mixture, indurated under moist heat, of anhydrous alumino-silicate material, an amount of alumino-silicic acid material equal to between 1.5% and 25% by weight of the amount of anhydrous alumino-silicate material, enough alkaline-earth base to produce reaction, and enough water to produce thorough wetting and form a compact wetted mass, with the solid ingredients all finely divided.

PAUL W. JONES.
JOHN W. SWEZEY.